United States Patent
Wisdom et al.

[11] Patent Number: 6,145,741
[45] Date of Patent: Nov. 14, 2000

[54] UNIVERSAL PRE-PAID GASOLINE AND TRAVEL CARD

[76] Inventors: Juanita J. Wisdom, P.O. Box 1028, Logandale, Nev. 89021; Deborah M. Wisdom, 119 Spring Hill Rd., Red Oak, Tex. 75154

[21] Appl. No.: 09/300,796

[22] Filed: Apr. 27, 1999

[51] Int. Cl.⁷ ...................................................... G06K 5/00
[52] U.S. Cl. ........................................... 235/380; 235/379
[58] Field of Search ..................................... 235/379, 380

[56] References Cited

U.S. PATENT DOCUMENTS 5,440,108  8/1995  Tran et al. ............................... 235/380

*Primary Examiner*—Harold I. Pitts
*Attorney, Agent, or Firm*—Harold Levine, P.C.

[57] ABSTRACT

A versatile universal prepaid petroleum-related (e.g., gasoline and oil) and travel card system that features a pre-paid card that can be used at any major brand filling station. The card is encoded with data indicating its authenticity; and provision is made for optional encoding identifying it with a particular user, company, individual or event. The card is also usable for purchase of non petroleum-related products such as the sundries sold at many filling stations. The card, when purchased by a prospective user, can initially be pre-encoded with specific dollar amounts (e.g., $50.00, $100.00) or be blank and when purchased be encoded with an amount selected and paid for by the purchaser. Moreover, the purchaser may, at any time, increase the then-existing amount by paying for the desired amount of increase in cash. When a purchase is made using the card, a card-reader authenticates its authenticity and decrements the amount of pre-paid credit remaining on the card by the amount of the purchase. If the amount of the purchase exceeds that of the credit remaining on the card, provision is made for the purchaser to remit the balance in cash. To reflect use of the card to make a purchase, a data bank is accessed to correspondingly credit an account of the seller.

14 Claims, 2 Drawing Sheets

UNIVERSAL PRE-PAID GASOLINE AND TRAVEL CARD

This invention relates to prepaid travel cards and more particularly to combination prepaid gasoline and travel cards acceptable at all principal brand filling stations and combination filling stations/convenience stores.

BACKGROUND OF THE INVENTION

Pre-paid credit cards have heretofore been known, illustrative of which are those offered by companies such as the Mobil Corporation for exclusive use at their facilities. Pre-paid cards have also been proposed for use in obtaining other products or services, for example, telephone calling cards.

In furtherance of the foregoing, a variety of implementing proposals have been made, illustrative of which are those set forth in German Patents DE 3,507,707and DE 4,012,842, British Patent 2,222,714 and U.S. Pat. Nos. 3,931,497, 4,900,906 and 5,340,969.

Although the proposals of these and other patents have addressed selected desired characteristics, there yet remain unresolved drawbacks to their use. Thus, for example, none of them offer the characteristic of universality, that is, acceptance at substantially all principal brand filling stations and combination filling stations/convenience stores. Thus there has continued to be a need for a system featuring a renewable pre-paid and versatile card that is acceptable at the gasoline pump and/or by a clerk at essentially all well-known brand filling stations and combination filling stations/convenience stores.

BRIEF SUMMARY OF THE INVENTION

The system according to the invention hereof includes an improved card that is pre-paid, renewable and universally acceptable at essentially all major brand filling stations/convenience stores. As such, it includes encoding to identify it as authentic and universally acceptable, coding that is recognized by card readers at pumps as well as by card processors at cash register facilities operated by clerical personnel. In addition to generalized identification coding, it includes changeable coding indicative of the pre-paid amount not yet used. When the card is presented for payment, such coding is automatically modified to represent a new amount equal to the previous amount less the amount of the current debit transaction. When the card is presented for addition to its prepayment (credit) amount, such coding is automatically modified to represent a new amount equal to the previous amount incremented by the amount currently added.

OBJECTS AND FEATURES OF THE INVENTION

It is one general object of the invention to improve prepaid credit cards.

It is another object of the invention to facilitate convenience and safety in the use of pre-paid credit cards.

It is yet another object of the invention to facilitate budget compliance, record keeping and reporting for users of pre-paid credit cards.

It is still another object of the invention to improve cost effectiveness in the use of credit cards.

It is still another object of the invention to provide an extendible range of use for pre-paid credit cards.

It is another object of the invention to facilitate acquisition of credit-type cards by persons having questionable credit histories.

It is yet another object of the invention to facilitate availability of pre-paid cards by making them attractive for sale by a variety of vendors such as, for example, Wall-Mart, K-Mart, gas stations, convenience stores, grocery stores, other facilities, and/or by mail.

Accordingly, in accordance with one feature of the invention, a pre-paid card is provided with an identification indicating its acceptability at substantially all filling stations and combination filling stations/convenience stores, thus enhancing safety, convenience and time effectiveness in use and eliminating the need for searching for a particular brand name.

In accordance with another feature of the invention, the aforementioned pre-paid card is rendered renewable so that the authorized level of prepayment may be increased by an authorized facility, thus improving flexibility and ease of repeated use.

In accordance with yet another feature of the invention, optional encoding may be embodied in the card to facilitate identification of purpose for which the card is used, thus simplifying record keeping and maintenance.

In accordance with still another feature of the invention, through use of a single universal card, multiple accounts and billings are reduced, and interest charges are eliminated, thus enhancing efficiency and cost effectiveness.

In accordance with yet another feature of the invention, by making the prepaid card essentially universally acceptable, it's attractiveness for use in purchasing products in addition to conventional petroleum products is extended, thus increasing its versatility.

In accordance with a further feature of the invention, through availability for purchase for cash, the use of cards is made available to persons having poor credit histories.

In accordance with still a further feature of the invention, optional provision may be made for tracking purchases by state, thereby facilitating the preparing and filing of state tax returns.

These and other objects and features of the invention will be apparent from the following description, by way of example of a preferred embodiment, with reference to the drawing.

DESCRIPTION OF A PREFERRED EMBODIMENT

Before proceeding to a detailed description of the invention, some additional general information may be helpful.

For purposes of this description and the accompanying claims, the term "User Entity" includes any or all of the following:

an individual person acting in their personal capacity, a person acting in connection with or on behalf of an organization, a purpose for which or behalf of which the pre-paid card is used, or an account for tracking a use or uses for which the card is employed.

DETAILED DESCRIPTION

Figure 1:
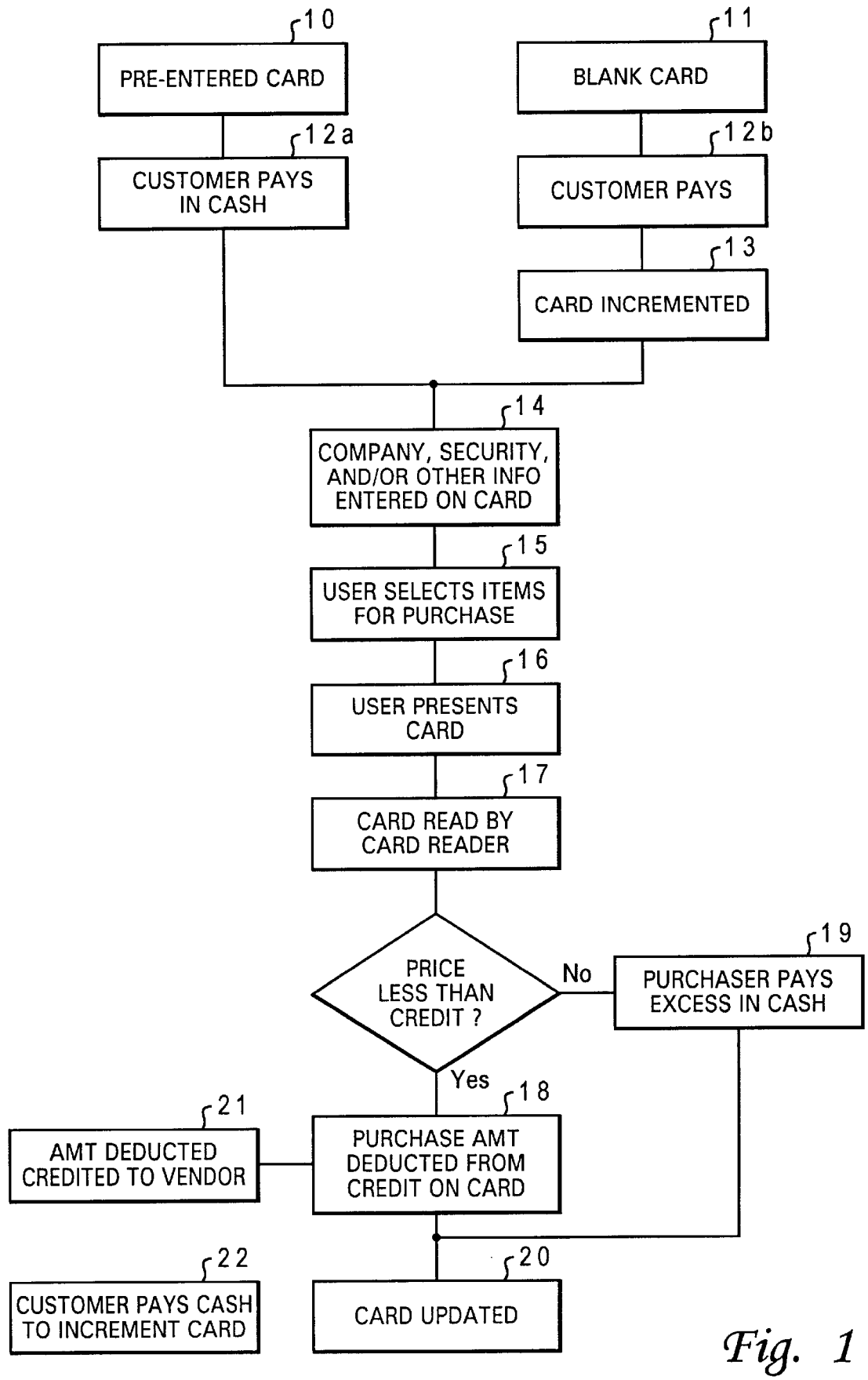
FIG. 1 A chart illustrating a simple system embodying the principles of the invention.

Now turning to the drawing, and more particularly FIG. 1 thereof, it will be seen to be a diagram illustrating operation of the system according to the invention. There, it will be observed is Block 10 which represents a card for which its pre-paid credit is entered prior to its purchase. Examples of such are cards that represent commonly requested pre-paid amounts such as $50.00, $100.00, $200.00 and the like. Thus, when a customer approaches a vendor selling the cards and asks for a universal pre-paid card, the sales person already has available cards representing the most popular amounts and can inform the prospect that pre-paid cards are available for such specified amounts. Block 11, on the other hand, represents a card that is customized for a customer who may ask for a card having a non-standard amount of credit. An example of the latter is that of a customer who asks for a card having a credit of $298.00 Blocks 12a and 12b represent payment for the card. Such payment typically is made in cash, although in some instances payment by check or account debit may be acceptable.

Block 13 represents an optional feature of incrementing the amount represented by the card. Thus, for example, if a customer wants to add to the amount of pre-paid credit existing or remaining in the card, the requested addition may be made upon payment therefor at a facility having a provision therefor (typically a facility selling the cards).

Block 14 represents entry of selected information (e.g., User Entity information) into the recordable medium of the card. Typically, such is made in a magnetic medium embodied in the card or through physical alteration of the external surface, or a combination thereof. The physical alteration may include embossing with indicating indicia such as arabic numerals, alphabetical letters or the like.

To facilitate use and prevent counterfeiting or unauthorized alteration, one or more authenticating and security codes may be recorded in each card. Such are read by well known conventional card-reading apparatus located at each point of sale where the cards are accepted (also represented by block 14).

When a card user wishes to use a card, such user selects one or more items for purchase (Block 15), after which the user typically presents the card either to an automated dispenser such as a gasoline pump or to a clerk at the cash register of the vendor facility (Block 16). The card is then read by the card reader to determine whether it includes a remaining credit equal to or greater than the amount of the desired purchase (Block 17). If the answer is "yes", the amount of purchase is deducted from the amount remaining in the card so that the card then contains a reduced credit (Block 18). If, on the other hand, the amount of credit represented by the card is less than the amount of purchase, the purchaser is given the option of paying the excess in cash (Block 19). As mentioned above, the card is updated to reflect any remaining balance as illustrated by Block 20.

Figure 2:
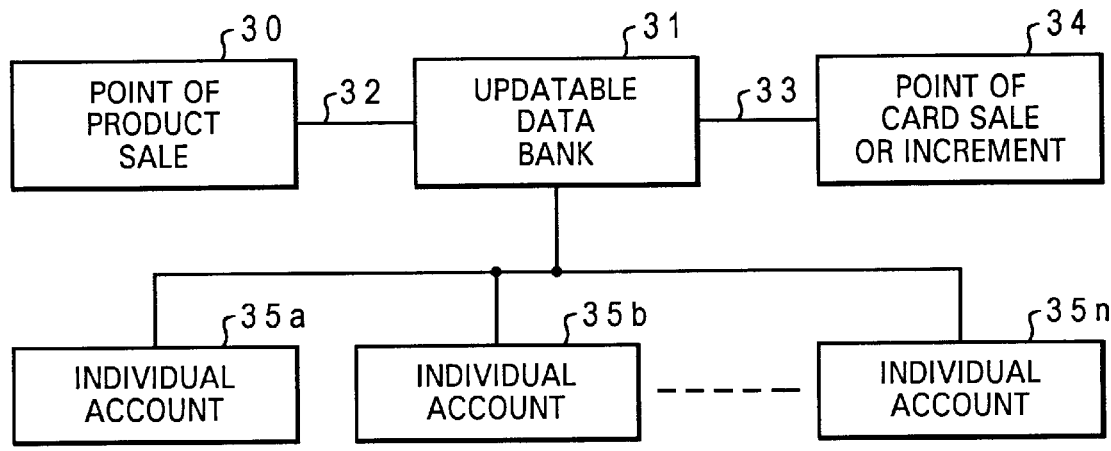
FIG. 2 is a chart illustrating the central data bank employed for maintaining a record of the amount of pre-paid credit remaining on each card together with credits made to organizations vending products through the system.

As mentioned in connection with description of Blocks 18 and 20, purchase amounts are deducted from the amounts remaining on the card. In addition, such amounts are employed to maintain a current record in one or more data bases represented by Blocks 21 and 31 (FIG. 2). Typically such amounts are credited to the accounts of vendors so that as cards are debited, corresponding credits are posted to the relevant accounts representing sale/purchase of the purchased item(s). Such data bases typically exist at the selling location as well as regional or central locations as business considerations may suggest.

Block 22 is set forth to represent that provision is made for incrementing the amount of credit on a card at any time by presenting the card to an authorized facility together with cash or other acceptable form of payment. Accordingly, use and usefulness of the card is substantially enhanced.

As mentioned above, FIG. 2 is a chart illustrating the central data bank employed for maintaining a record of the amount of pre-paid credit remaining on each card together with credits made to organizations vending products through the system. There, it will be seen, are Block 30 which represents the point of sale of the product(s) being purchased. It is interconnected with updatable data bank 31 via communication channel 32. Also connected with data bank 31 as shown by communication channel 33 is the point (Block 34) at which the card itself is sold (or incremented). Further, it will be observed are shown individual accounts for various ones of the companies/vendors participating in the system. These are illustrated and represented by Blocks 35a–35n. Thus, as will be observed from FIG. 2, provision is made for tracking, monitoring and appropriately debiting and/or crediting relevant accounts as mentioned above. Optionally and in addition, tracking of expenses by state may be included in such data base, thereby facilitating preparation of state tax returns.

Figure 3:
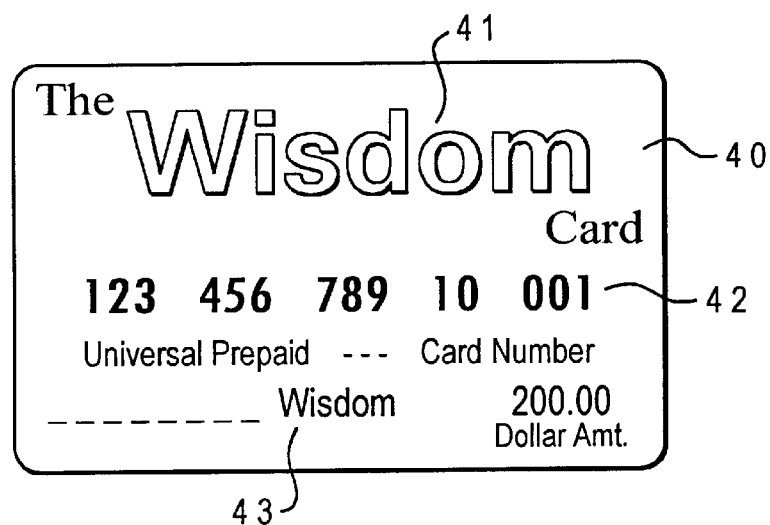
FIG. 3 is a top view of a card for use in practicing the invention hereof.

FIG. 3 is a top view of a card for use in practicing the invention hereof. There, it will be seen, is a conventional-sized card 40 preferably containing at least a name 41 (e.g., The Wisdom Card), space 42 for the aforementioned optional embossing (in FIG. 3 shown as a series of arabic numerals), and a region generally shown as at location 43 for magnetic or other encoding media including a dollar amount and optional indicia such as those illustrated in the drawing.

It will now be evident that there has been described herein an improved and highly versatile system exhibiting features as set forth above.

Although the inventions hereof have been described by way of a preferred embodiment, it will be evident that many adaptations and modifications may be employed without departing from the spirit and scope thereof. For example, a card could be pre-designated with accounting information to facilitate accounting maintenance and tracking.

The terms and expressions employed herein have been used as terms of description and not of limitation; and thus, there is no intent of excluding equivalents, but on the contrary it is intended to cover any and all equivalents that may be employed without departing from the spirit and scope of the inventions.

What is claimed is:

1. A universal pre-paid gas and travel card system comprising:
   (a) a card embodying indicia:
      (i) identifying said card as being essentially universal and authentic;
      (ii) identifying a monetary amount of pre-paid credit remaining in said card;
   (b) means for identifying purchase of a product and price of said product;
   (c) means including a card reader responsive to presentation of said card in payment for said product for:
      (i) identifying authenticity and universality of said card and for identifying said monetary amount of said pre-paid credit remaining in said card; and
      (ii) reducing said monetary amount of said pre-paid credit remaining in said card by an amount equal to said price of said product.

2. A universal pre-paid gas and travel card system according to claim 1 further including means effective when said price of said product exceeds said monetary amount of said pre-paid credit remaining in said card for creating and displaying indicia indicative thereof.

3. A universal pre-paid gas and travel card system according to claim 2 further including means authorizing payment by cash of an amount equal to said price of said product less said monetary amount of said pre-paid credit remaining in said card.

4. A universal pre-paid gas and travel card system according to claim 1 further including means for adding prepaid credit amounts to said card.

5. A universal pre-paid gas and travel card system according to claim 1 wherein said indicia further include account identifying means for selectively identifying said card with a user entity.

6. A universal pre-paid gas and travel card system according to claim 1 wherein said indicia further include account identifying means for selectively identifying said card with a predetermined account.

7. A universal pre-paid and travel card system according to claim 1 wherein said indicia further include a programmable personal identification number.

8. A universal pre-paid gas and travel card system according to claim 1 further including data bank means maintaining data identifying said monetary amount of said pre-paid credit remaining in said card, and control means responsive to use of said card in payment for a purchased product for debiting said monetary amount by a purchase-representing amount equal to purchase price of said purchased product and for correspondingly crediting an account of the seller of said purchased product.

9. A universal pre-paid gas and travel card system according to claim 8 further including means effective when said price of said product exceeds said monetary amount of said pre-paid credit remaining in said card for creating and displaying indicia indicative thereof.

10. A universal pre-paid gas and travel card system according to claim 8 further including means authorizing payment by cash of an amount equal to said price of said product less said monetary amount of said pre-paid credit remaining in said card.

11. A universal pre-paid gas and travel card system according to claim 8 further including means for adding prepaid credit amounts to said card.

12. A universal pre-paid gas and travel card system according to claim 8 wherein said indicia further include account identifying means for selectively identifying said card with a user entity.

13. A universal pre-paid gas and travel card system according to claim 8 wherein said indicia further include account identifying means for selectively identifying said card with a predetermined account.

14. A universal pre-paid and travel card system according to claim 8 wherein said indicia further include a programmable personal identification number.

* * * * *